United States Patent [19]

Anderson et al.

[11] B 3,914,377

[45] Oct. 21, 1975

[54] CATALYST REACTOR FOR OXIDIZING CARBON MONOXIDE AND HYDROCARBONS IN GASEOUS STREAM

[75] Inventors: Conroy D. Anderson, Turnersville; David W. Carlson, Willingboro; Stephen M. Oleck, Moorestown; William A. Stover, Woodbury, all of N.J.

[73] Assignee: Mobil Oil Corporation, New York, N.Y.

[22] Filed: July 7, 1972

[21] Appl. No.: 269,673

[44] Published under the Trial Voluntary Protest Program on January 28, 1975 as document no. B 269,673.

[52] U.S. Cl. ............. 423/213.7; 423/245; 423/247
[51] Int. Cl.² ........................................ B01D 53/34
[58] Field of Search ........... 423/213, 214, 245, 247; 23/288 F; 252/473

[56] References Cited
UNITED STATES PATENTS

| | | | |
|---|---|---|---|
| 2,004,865 | 6/1935 | Grison | 423/213 |
| 3,086,839 | 4/1963 | Bloch | 423/213 |
| 3,265,637 | 8/1966 | Stiles | 423/213 X |
| 3,295,919 | 1/1967 | Henderson et al. | 423/213.5 |
| 3,485,593 | 12/1969 | Lenane et al. | 423/213 X |
| 3,540,838 | 11/1970 | Reitmeier et al. | 423/213 |
| 3,741,725 | 6/1973 | Graham | 423/213.5 |

FOREIGN PATENTS OR APPLICATIONS

1,010,783  11/1965  United Kingdom ................. 423/213

OTHER PUBLICATIONS

Anderson et al., Ind. & Eng. Chemistry, Vol. 53, No. 10, 10–1961.

Primary Examiner—G. O. Peters
Attorney, Agent, or Firm—Charles A. Huggett; Raymond W. Barclay; Dennis P. Santini

[57] ABSTRACT

A catalyst reactor system for reducing the amount of carbon monoxide and hydrocarbons in a gaseous stream which comprises a first bed consisting essentially of 7–20 weight percent copper oxide and 0.01–5 weight percent palladium, said copper oxide and palladium being co-impregnated on an inorganic oxide support comprising at least 50 percent by weight alumina and a second bed comprising 0.01–5 percent by weight palladium supported on a porous inorganic oxide support.

7 Claims, 1 Drawing Figure

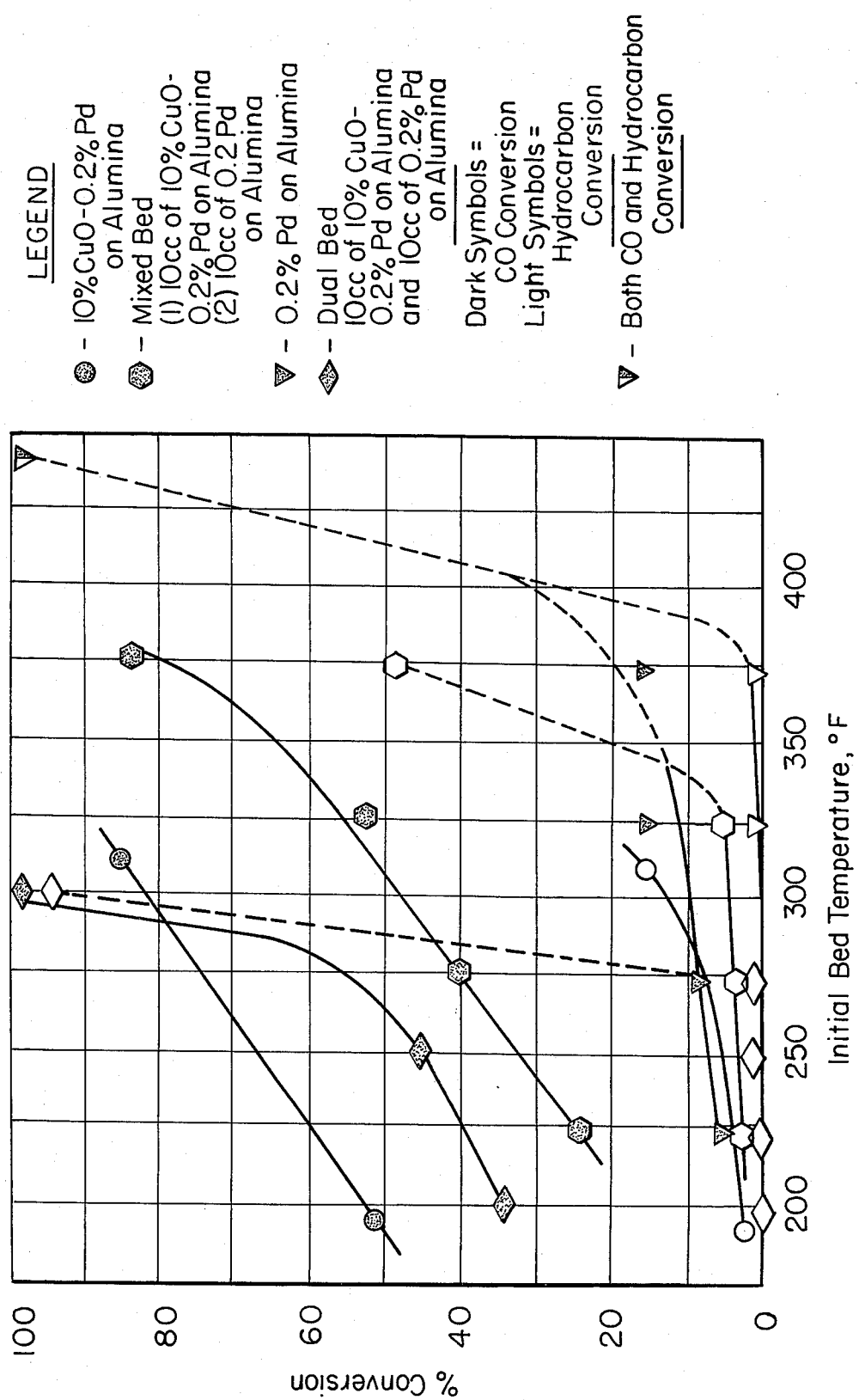

CATALYST REACTOR FOR OXIDIZING CARBON MONOXIDE AND HYDROCARBONS IN GASEOUS STREAM

BACKGROUND OF THE INVENTION

Field of the Invention

This invention is directed to a catalyst reactor system for reducing the amount of carbon monoxide and hydrocarbon effluents entrained in a gaseous stream such as the exhaust effluent of an internal combustion engine or the like. More particularly, this invention is directed to a catalyst reactor system for reducing the amount of carbon monoxide and hydrocarbons in automobile exhaust effluent streams by the oxidation of carbon monoxide to carbon dioxide and the conversion of noxious hydrocarbons to less noxious components.

Discussion of the Prior Art

With the advent of the field of ecology in more recent times there has been an increasing emphasis upon the purification of automobile engine exhausts. Specifically, two of the components of such exhaust systems which are most odious or intolerable are entrained carbon monoxide and unreacted hydrocarbons. It has long been desired to prepare a catalyst system useful in an automobile exhaust system which will convert the entrained unreacted hydrocarbon to a less noxious component. To this end many systems have been prepared, most of which involve an inorganic oxide reactant supported on an inorganic oxide support. For years, the art has recognized the oxidation abilities of copper oxide in respect of carbon monoxide in exhaust gases. To date, no really commercial exhaust catalyst composition or system has been provided which will not only oxidize the carbon monoxide, but enable the reduction of the noxious hydrocarbon entrained in the exhaust gases to acceptable levels.

Specifically, various catalyst systems have been proposed. U.S. Pat. No. 3,428,573 discloses the use of a copper oxide-platinum catalyst supported upon clay and an alumina gel all combined with a form of crystalline alumina. U.S. Pat. No. 3,072,458 discloses the use of platinum and copper on a support material, for instance, alumina. Dual bed type catalytic compositions for use in an exhaust muffler are contemplated by U.S. Pat. No. 3,540,838 disclosing generally the use of calcined kaolin and alumina gel together with the crystalline alumina, all of which is combined with copper oxide and palladium in a first bed. A second bed of substantially the same composition is employed. U.S. Pat. No. 3,503,715 disclosed the use of an exhaust catalyst system of two beds. The first bed comprises platinum on alumina treated with an alkaline metal. The second bed comprises platinum on alumina. Other patents in this field include U.S. Pat. No. 3,409,920; British Pat. No. 1,009,609; British Pat. No. 942,841; British Pat. No. 1,034,621 and others. None of these have provided the specific catalyst composition which provides synergistic results both in terms of the reduction of carbon monoxide in the exhaust gas and the reduction of the entrained noxious hyrocarbons.

SUMMARY OF THE INVENTION

Broadly, this invention contemplates a dual-bed catalyst reactor system for reducing the amount of carbon monoxide and noxious hydrocarbons in a gaseous stream such as automobile exhaust effluent which comprises a first bed consisting essentially of 7–20 weight percent copper oxide and 0.01–5 weight percent palladium, said copper oxide and palladium being co-impregnated on an inorganic oxide support comprising at least 50 percent by weight alumina and a second bed comprising 0.01–5 percent by weight palladium supported on a porous inorganic oxide support.

DISCUSSION OF PREFERRED EMBODIMENTS

In accordance with the present invention, there is provided a catalyst reactor system comprising two beds. The first bed comprises 7–20 weight percent copper oxide and 0.01–5 weight percent palladium co-impregnated on an inorganic oxide support containing at least 50 percent by weight alumina. The second bed comprises an inorganic oxide porous support on which is deposited 0.01–5 weight percent palladium. Preferably, in the first bed the copper oxide is between about 10 and about 15 weight percent and the palladium is present in an amount between about 0.02 and about 0.5 weight percent.

It has been found, pursuant to the present invention, that an amount of copper oxide of at least 7 weight percent is necessary in the first bed to enable sufficient conversion of the carbon monoxide such as to maintain the activity of the palladium impregnated porous inorganic oxide support which constitutes the catalyst composition of the second bed. The copper oxide is in intimate association with between 0.01 and 5 weight percent palladium placed on the aluminiferous support by co-impregnation. In this regard, it has been found, unexpectedly, that catalyst compositions comprising mixtures of copper oxide and palladium on alumina wherein the materials are not co-impregnated do not provide the desired conversion necessary for the first bed. The first bed provides the desired conversion of the carbon monoxide enabling synergistic results to be obtained for the overall process, especially at low catalyst bed temperatures.

The porous inorganic oxide support for the first bed is an alumina-containing support containing at least 50 weight percent alumina, based on the total weight of the composition. When the gaseous stream to be passed through the catalyst reactor system is an internal combustion engine exhaust effluent, the entire inorganic oxide support is preferably alumina. It should be understood that minor amounts of other inorganic oxide supports such as thoria, titania or silica may be present up to the amounts specified. However, catalytic results indicated that a composition wherein alumina is the sole inorganic oxide support provided better conversion of the carbon monoxide as an internal combustion engine exhaust effluent passes through the first bed.

The composition of the support material of the second catalyst bed is less critical than that of the first. The reactive component is palladium present in an amount between 0.01 and 5 percent by weight, based upon the total weight of the catalyst composition comprising the second bed. The palladium component in the second bed is supported upon a porous inorganic oxide support such as silica, alumina, titania, zirconia or combinations thereof such as silica/alumina, silica/titania, alumina/titania and the like. This second bed is caused to be heated up by reactions which occur in the adjacent first bed. Since the second bed is, itself catalytically active and has been heated up by virtue of the exothermic reaction caused by the oxidation of carbon monoxide, the second bed is suitable for the oxidation of entrained lower molecular weight hydrocarbons in the exhaust gases.

The present invention is particularly useful for decreasing the amount of carbon monoxide and entrained noxious hydrocarbons in internal combustion engine exhaust effluent streams during the start-up of an automobile or other internal combustion engine. The dual bed catalyst system has particular application when the temperature of the engine exhaust gas and catalyst bed are low and the potential of combustible discharge into the atmosphere is high. At low temperatures, it is difficult to convert carbon monoxide and noxious hydrocarbons to their oxidation products. It has been found by testing prior art type catalyst systems for automobile exhaust systems that during start-up, the most harmful amounts of carbon monoxide and unreacted noxious hydrocarbons are emitted to the air. Existing catalyst systems have failed to adequately deal with the problem of emission control during engine start-up. The catalyst system of the present invention provides low temperature emission control of combustibles in the exhaust gas, rapid warm-up of the catalyst by the heat of combustion in the first catalyst bed and substantially complete overall carbon monoxide and noxious hydrocarbons oxidation at low initial temperature.

The specific catalytic system for reduction of harmful components of such above gaseous streams comprises at least 7 percent by weight copper oxide. There is set forth below data which demonstrates that amounts less than 7 weight percent copper oxide are wholly inadequate for substantial conversion of the carbon monoxide component as the gaseous stream passes through the first bed. If there is an insufficient amount of carbon monoxide converted as the gaseous stream passes through the first catalyst bed, the second catalyst bed is substantially less effective in the oxidation of entrained noxious hydrocarbons. The effect is that the entire conversion system is poor and generally inadequate for use in a catalytic exhaust system. The thrust of the present invention is the utilization of a first bed having the proper substances in proper amounts so as to high carbon monoxide conversion, thereby allowing the second bed comprising the noble metal component on an inorganic oxide support to oxidize the entrained noxious hydrocarbons free of substantial interference due to the presence of carbon monoxide.

It is stated above that the copper oxide and palladium on the support in the first catalyst bed are co-impregnated. The co-impregnation of the copper oxide and palladium is necessary to prepare a suitable first bed catalyst composition. If the composition is prepared by first placing copper or its oxide on the catalyst and then impregnating with a source of palladium, the resultant catalyst composition does not provide the desired carbon monoxide conversion. If the sequence of impregnation is reversed, the catalyst composition is still woefully inadequate to provide enough conversion of carbon monoxide, especially during start-up (when the gaseous stream is internal combustion engine exhaust effluent) as to decrease the potentially harmful effect that the carbon monoxide can have on the hydrocarbon oxidation catalyst of the second bed. Only when the copper oxide and palladium are co-impregnated upon the alumina-containing support is there obtained a catalyst composition which, as a first catalyst bed, provides the necessary reduction of carbon monoxide content and the desired heat up of the second catalyst bed.

Further, said above co-impregnation must be carried out in a non-acidic medium, i.e. a medium with a pH $\geq 7$, in order for there to be meaningful catalytic activity in conversion of carbon monoxide, especially during the start-up period of internal combustion engines where catalyst bed temperatures are low, e.g. 300°F and less. It is preferable, although not essential, that said non-acidic medium be an ammoniacal solution. The type of solution useful in this regard, i.e. ammoniacal or other, is dictated by the solubility of the components, e.g. cuprous chloride, in the solution.

Further, the source of the copper oxide for the catalyst of the first bed is preferably a cuprous ($Cu^+$) salt of copper, such as, for example, the halide (e.g. chloride, bromide or iodide) salt. Such a source of the copper oxide is preferable over use of, for example, the cupric ($Cu^{++}$) salt, e.g. a nitrate of copper.

When a cuprous halide is the source of the copper oxide for the catalyst of the first bed, an ammoniacal solution is used to dissolve the cuprous halide to produce a cuprous amine complex. This type solution is necessitated by the solubility characteristics of cuprous halides.

The anomaly of the present invention is that the copper oxide-palladium-alumina catalyst of the first bed by itself is very active for carbon monoxide oxidation at low temperatures, but is relatively poor for hydrocarbon oxidation. Palladium-alumina, by itself conversely, is very active for hydrocarbon oxidation at higher temperatures, but at lower temperatures, such as at 300°F, is a poor catalyst composition for oxidation of both carbon monoxide and lower molecular weight hydrocarbons. Its ability to oxidize hydrocarbons at 300°F is severely inhibited by the presence of carbon monoxide. Thus, the use of these two catalysts in two separate catalyst reactor beds, the copper oxide-palladium-alumina catalyst to convert most of the carbon monoxide, followed by the palladium:inorganic oxide catalyst composition operating at a much lower level of carbon monoxide, provides the best overall carbon monoxide and hdyrocarbon conversion efficiencies at an initial bed temperature of, for instance, 300°F.

In order to more fully illustrate the nature of the present invention and the manner of practicing same, the following examples are presented. A tabulation of test results of the catalyst system of the present invention is set forth in the Table following the example descriptions.

EXAMPLE 1

A catalyst comprising 10 weight percent copper oxide and 0.2 weight percent palladium on alumina was prepared by initially dissolving 39.6 grams of cuprous chloride and 9.5 grams tartaric acid in 130 cc of 29 percent ammonia solution. The ammonia solution was thereafter diluted to 300 ml with water. The concentration was equivalent to 0.106 grams copper oxide per cubic centimeter of solution. 0.54 Gram of palladium nitrate was dissolved in 120 cc of the copper oxide ammonia aqueous solution. 120 Cubic centimeters of the resultant solution containing palladium were poured over 100 grams of 8 × 10 mesh alumina spheres. The alumina spheres were permitted to adsorb the solution for a one hour period of soaking. Excess solution was drained from the spheres and the spheres were dried overnight at 250°F. The resultant dry spheres were calcined in flowing air at a temperature up to 1400°F for 3 hours.

EXAMPLE 2

A catalyst comprising 10 weight percent copper oxide and 90 weight percent alumina (without any palladium) was prepared by initially dissolving 13.8 grams cuprous chloride and 3.3 grams tartaric acid in 45 cubic centimeters of concentrated ammonium hydroxide solution (28 percent ammonia). The solution was diluted to 55 cc with water. 100 grams of 8 × 10 mesh alumina spheres (same as that of Example 1) were impregnated with the cuprous chloride ammonia solution to incipient wetness. The alumina spheres were dried in an oven at 250°F. Thereafter, they were calcined in flowing air for 3 hours at a temperataure up to 1400°F.

EXAMPLE 3

A catalyst comprising 0.2 weight percent palladium on alumina spheres was prepared by initially dissolving 0.44 gram palladium nitrate in water and diluting same to 55 cc with water. The solution contained 0.20 gram palladium. 100 Grams of 8 × 10 mesh alumina spheres (as employed in Examples 1 and 2 above) were impregnated to incipient wetness with all of the above prepared solutions. The spheres were dried in an oven at 250°F. Thereafter, they were calcined in flowing air for 3 hours at a temperature of up to 1,400°F.

EXAMPLE 4

A physical mixture of the composition of Example 1 and Example 3 was prepared in equal weight simply by physically mixing the two catalyst compositions together.

EXAMPLE 5

A catalyst system was prepared by forming two beds, a first bed which comprises the catalyst composition of Example 1, adjacent which was a second bed with the catalyst composition of Example 3. Each bed comprised about 50 percent by weight of the total catalyst composition employed in the catalyst system.

All of the catalyst bed compositions were evaluated for the ability to convert carbon monoxide and propylene, a typical hydrocarbon in exhaust gases, at 300°F. The temperature 300°F was chosen since it approximates the initial temperature of the exhaust gases from an internal combustion engine of an automobile during start-up. Thus, the results depicted in the table below for these conversions indicate the relative abilities of the various catalyst systems to convert carbon monoxide and hydrocarbons during the start-up of an automobile. The tests were conducted in a quartz reactor with inlet gas of 2 percent CO, 400 ppm propylene, 4.5 percent $O_2$, 10 percent $H_2O$, 10 percent $CO_2$ and $N_2$. In all cases, 3 liters per minute of gas flowed over 20 cc of catalyst, giving an approximate space velocity of 8400 hours $^{-1}$ at standard conditions. The catalyst was lined out at given bed temperatures. The test gas was introduced, and after 10–15 minutes CO and HC conversion and final bed temperatures were measured.

Table

Comparison of Catalyst Performance

| Catalyst System | Gas Flow Rate, 1pm | % Conversion at 300°F Initial Bed Temperature CO | Hydrocarbon |
|---|---|---|---|
| Example 1 | 3 | 82 | 12 |
| Example 2 | 3 | 0 | 0 |
| Example 3 | 3 | 11 | 0 |
| Example 4 | 3 | 55 | 5 |
| Example 5 | 3 | 98 | 94 |

From the data seen above, it is most apparent that good conversions of carbon monoxide and hydrocarbon are obtainable only by employing a catalyst reactor system comprising two catalyst beds (Example 5), the first bed comprising a catalyst composition having at least about 7 weight percent copper oxide. The results obtained are considered particularly surprising in view of the poor results obtained by the physical mixture (Example 4) of the catalyst composition of Example 1 and 3. Thus, it is seen that by using the catalyst compositions of Examples 1 and 3 adjacent to one another, synergistic results are obtained (Example 5). The initial bed of copper oxide-palladium-alumina provides high carbon monoxide conversion enabling the second bed comprising palladium and alumina to be highly active for hydrocarbon oxidation.

In the drawing which forms a part of this application, there is set forth graphically the carbon monoxide and hydrocarbon conversions as a function of initial catalyst bed temperature for various catalyst reactor systems. It will be noted that only the dual bed system provides high carbon monoxide and hydrocarbon conversion at initial bed temperature of 300°F. The palladium on alumina catalyst is highly effective for hydrocarbon conversion, e.g. propylene, but only at temperatures of 375°F and above. The copper oxide-palladium on alumina catalyst is highly effective for carbon monoxide conversion but is a poor catalyst for hydrocarbon conversion. The mixed bed system, i.e. wherein the copper oxide-palladium-alumina and palladium-alumina catalysts are mixed together in one bed, provides fair carbon monoxide conversion but the hydrocarbon conversion does not approach acceptable levels until bed temperatures are at least 375°F or more. Thus, it is only by the combination of the two catalyst compositions as a dual bed, i.e. two beds separate from each other, in contrast to a physical mixture thereof, that the high carbon monoxide and hydrocarbon conversions are provided.

EXAMPLE 6

A catalyst comprising 10 percent by weight copper oxide and 0.02 percent by weight palladium on 6 × 8 mesh alumina spheres was prepared by dissolving 130 grams of cuprous chloride (96.8 percent assay CuCl) and 30.4 grams tartaric acid in 400 cubic centimeters of a 28 percent aqueous ammonia solution. The solution was dilluted to 500 cc with water. It contained the equivalent of 0.202 gram copper oxide per cubic centimeter. 140 Cubic centimeters of this solution were sprayed onto 210 grams of the 6 × 8 mesh alumina spheres as they rotated in a rolling jar until the alumina reached incipient wetness. Another 210 grams of alumina spheres were sprayed with 140 cubic centimeters of the copper oxide solution. Both batches of impregnated spheres were combined and dried together overnight at 2502 F. A 108 gram portion of the spheres was weighed out. The 108 grams were immersed for one hour in a solution made by diluting 0.4 gram of a 5 weight percent palladium solution of palladium chloride with 125 cubic centimeters of water. After the 1 hour of immersion, the alumina spheres were drained of excess solution and dried at 250°F overnight. Thereafter, they were calcined in flowing air for 3 hours at 1,100°F.

Twenty cubic centimeters of this material were tested as described above to determine their ability to convert carbon monoxide to carbon dioxide. There is set forth below the results obtained for these conversions at varying gas flow rates and catalyst bed temperatures.

| Gas Flow Rate, lpm | Furnace Temp. °F | Catalyst Temp. °F | Percent CO Conv. | Percent $C_3H_6$ Conr. |
|---|---|---|---|---|
| 3 | 200 | 318 | 51 | 0 |
| 1 | 200 | 300 | 75 | 0 |
| 6 | 200 | 280 | 31 | 0 |

The results with gas flow rate at 1 liter per minute may be compared with the results for a copper oxide alumina catalyst of Example 2. This comparison is set forth below:

| Catalyst of Example | Composition | Furnace Temp. °F | Catalyst Temp. °F | CO OF | $C_3H_6$ Con.% |
|---|---|---|---|---|---|
| 2 | 10% $CuO$-$Al_2O_3$ | 200 | 210 | 0 | 0 |
| 6 | 0.02 Pd-10% $CuO$-$Al_2O_3$ | 200 | 300 | 75 | 0 |

The above results clearly show the promotional effect of the 0.02 weight percent palladium. Without palladium, the carbon monoxide conversion is nil; with only 0.02 weight percent palladium in the catalyst, the carbon monoxide conversion increases to 75 percent. Thus, both copper oxide and palladium must be present.

The importance of having at least 7 weight percent copper oxide on the catalyst composition is demonstrated by the following comparative test examples:

EXAMPLE 7

A catalyst comprising 1 weight percent copper oxide and 0.2 weight percent palladium on 8 × 10 mesh alumina spheres was prepared by initially measuring out 11 cubic centimeters solution containing 0.106 gram copper oxide per cc. This is the same solution employed in Example 1 above. The solution was thereafter diluted to 120 cubic centimeters with water. 0.54 Gram of palladium nitrate was dissolved into the solution. The solution containing both metals was poured over 100 grams of 8 × 10 mesh alumina spheres and let soak for 1 hour. Thereafter it was drained of excess solution and dried at 250°F overnight. After it was dried it was calcined in flowing air for 3 hours at 1,400°F. Twenty cubic centimeters of this catalyst were tested as described above, with variation of gas flow rate, with the results below:

| Gas Flow Rate, lpm | Furnace Temp. °F | Catalyst Bed Temp. °F | CO Conversion % | Propylene Conversion % |
|---|---|---|---|---|
| 3 | 185 | 195 | 2 | 0 |
| 1 | 185 | 195 | 7 | 0 |
| 1 | 250 | 270 | 13 | 4 |
| 1 | 355 | 400 | 31 | 22 |
| 3 | 350 | 390 | 16 | 9 |

This catalyst (Example 7), comprising only 1 weight percent copper oxide and 0.2 weight percent palladium, is much less active than the catalyst containing, for instance, 10 weight percent copper oxide and 0.2 weight percent palladium (Example 1). In fact, the above results appear to be similar to results obtained for a palladium-alumina catalyst which does not contain any copper oxide, i.e. it is not particularly effective for carbon monoxide conversion even at low gas flow rates. Significant conversions are only obtained when the catalyst bed temperature is well in excess of 300°F, i.e. the catalyst is not particularly effective during internal combustion engine start-up conditions.

EXAMPLE 8

A catalyst comprising 4 weight percent copper oxide and 0.2 weight percent palladium on 8 × 10 mesh alumina spheres was prepared by initially dissolving 2.9 grams cuprous chloride and 0.7 gram tartaric acid in 40 cubic centimeters of concentrated ammonium hydroxide solution (28 percent ammonia). To that solution was added 1.1 cubic centimeters of a 0.1 gram palladium/cc solution of palladium nitrate. The solution was diluted with water to 40 cc total volume. A flask containing 55 grams of the 8 × 10 mesh alumina spheres was evacuated and the palladium-copper oxide solution was added. After the flask was shaken to distribute the solution evenly over the spheres, the spheres were collected and placed in a dryer set at 250°F. After they were dried, they were calcined in flowing air for 3 hours at 1,400°F. The catalyst had a packed density of 0.44 gram per cubic centimeter.

Twenty cubic centimeters of this catalyst were tested according to the same cold start procedure described above. The gas flow rate was 3 liters per minute. In the table below, there is set forth the results for converting carbon monoxide and propylene at various catalyst bed temperatures.

| Furnace Temp. °F | Catalyst Bed Temp. °F | CO Conversion, % | Propylene Conversion,% |
|---|---|---|---|
| 250 | 210 | 19 | 0 |
| 250 | 260 | 22 | 1 |
| 350 | 332 | 30 | 3 |
| 350 | 381 | 26 | 7 |

It will be seen from these results that this catalyst composition containing only 4 weight percent copper oxide does not provide appreciable carbon monoxide conversion even when the bed temperature is as high as 381°F. Similarly, the propylene conversion is poor. Catalysts with 1 and 4 weight percent copper oxide show a little rise in bed temperature as the gas inlet temperature (furnace temperature) rises. Catalysts containing 10 weight percent copper oxide show a large rise in bed temperature at the inlet temperatures shown above. This high rise of catalyst bed temperature is highly desirable in that it provides a desirable temperature for the operation of the palladium-alumina catalyst in the second bed. Similarly, this temperature facilitates the conversion of the carbon monoxide. These results imply that a catalyst for the first bed must contain at least 7 weight percent copper oxide.

The preferability of having the source of CuO be a cuprous salt at pH $\geq$ 7 as opposed to having said source be a cupric salt at a lower pH is demonstrated by the following examples.

EXAMPLE 9

A catalyst comprising approximately 10 weight percent copper oxide and 0.28 percent palladium on alumina was prepared by dissolving 7.5 grams of cuprous chloride and 1.8 gram tartaric acid in 35 cubic centimeters of concentrated ammonium hydroxide solution (28 percent ammonia). To this solution was added 1.2 cubic centimeters of 0.1 gram palladium per cubic centimeter solution of palladium nitrate. The total solution was then diluted to 66 cubic centimeters with water and had a pH of about 10.5. 55 Grams of 8 × 10 mesh alumina spheres were then co-impregnated with the above dilute solution. The impregnated alumina spheres were then dried at 250°F and calcined in flowing air for 3 hours at 1000°F. The impregnated alumina spheres thus prepared had a packed density of approximately 0.8 gram per cubic centimeter.

EXAMPLE 10

A catalyst comprising approximately 10 weight percent copper oxide and approximately 0.1 weight percent palladium on alumina was prepared by dissolving 18.6 grams of cupric nitrate and 1.4 grams sorbitol in 30 cubic centimeters of water. To this was added 0.6 centimeter of 0.1 gram palladium per cubic centimeter solution of palladium nitrate. The total solution was diluted to 45 cubic centimeters with water and had a pH of less than 7.0. 55 Grams of 8 × 10 mesh alumina spheres were impregnated with the above solution. The alumina spheres were dried at 250°F and calcined in flowing air for 3 hours at 1400°F. The impregnated alumina spheres thus prepared had a packed density of 0.47 gram per cubic centimeter.

The catalysts prepared by Examples 9 and 10 were tested for CO conversion as defined above. The following tabulation sets forth the results, obtained by extrapolation of actual test results to 40 percent CO conversion, showing the allowed space velocities useful for obtaining such 40 percent conversion of CO at a specified temperature.

| Catalyst | Relative Space Velocity Allowed for 40 Percent Conversion of CO |
| --- | --- |
| Example 9 | 0.85 |
| Example 10 | 0.01 |

Therefore, as is observed from the above data, the catalyst prepared according to Example 9 can be considered to be 85 times more active than the catalyst prepred according to Example 10 at the same temperature. The catalyst prepared according to Example 9 had cuprous amine halide solution at 10.5 pH as its source of copper oxide. The catalyst prepared according to Example 10 had acidic cupric nitrate solution as its source of copper oxide.

We claim:
1. In a dual-bed process for reducing the amount of low molecular weight hydrocarbons and carbon monoxide in a gaseous stream, the improvement which comprises the following sequential steps:
   a. passing said gaseous stream through a first catalyst bed consisting essentially of 7–20 weight percent copper oxide and 0.01–5 weight percent palladium, said copper oxide and palladium being co-impregnated from a non-acidic solution of a cuprous salt and a palladium salt upon a porous inorganic oxide support comprising at least 50 percent by weight of alumina, and thereafter
   b. passing the gaseous stream from said first catalyst bed through a second catalyst bed consisting essentially of 0.01–5 weight percent palladium impregnated on a porous inorganic oxide support, whereby the low temperature conversion of said low molecular weight hydrocarbons and carbon monoxide is improved.

2. The process of claim 1 wherein said non-acidic solution for co-impregnation of the catalyst of step (a) is an ammoniacal solution.

3. The process of claim 1 wherein the catalyst of step (a) consists essentially of 10–15 weight percent copper oxide and 0.02–0.5 weight percent palladium.

4. The process of claim 1 wherein the porous inorganic oxide support of the catalysts of both steps (a) and (b) is alumina.

5. The process of claim 1 wherein said first catalyst bed of step (a) has an initial catalyst bed temperature of about 300°F.

6. A process according to claim 1 wherein said gaseous stream is an internal combustion engine exhaust effluent.

7. A process according to claim 6 wherein said exhaust effluent is from an automobile engine.

* * * * *

UNITED STATES PATENT AND TRADEMARK OFFICE
CERTIFICATE OF CORRECTION

PATENT NO. : 3,914,377
DATED : October 21, 1975
INVENTOR(S) : CONROY D. ANDERSON, DAVID W. CARLSON, STEPHEN M. OLECK and WILLIAM A. STOVER It is certified that error appears in the above-identified patent and that said Letters Patent are hereby corrected as shown below:

Column 6, line 66,      "2502F" should be --250°F--.
Column 7, line 26,      "OF" should be --Con. %--.
Column 7, line 29,      "0.02" should be --0.02%--.

Signed and Sealed this tenth Day of February 1976

[SEAL]

Attest:

RUTH C. MASON
*Attesting Officer*

C. MARSHALL DANN
*Commissioner of Patents and Trademarks*